United States Patent
Peters et al.

(10) Patent No.: US 6,907,191 B2
(45) Date of Patent: **\*Jun. 14, 2005**

(54) MEDIA RECORDER FOR CAPTURE AND PLAYBACK OF LIVE PRERECORDED AUDIO AND/OR VIDEO INFORMATION

(75) Inventors: Eric C. Peters, Carlisle, MA (US); John J. Walsh, North Chelmsford, MA (US)

(73) Assignee: Avid Technology, Inc., Tewksbury, MA (US)

( * ) Notice: Subject to any disclaimer, the term of this patent is extended or adjusted under 35 U.S.C. 154(b) by 207 days.

This patent is subject to a terminal disclaimer.

(21) Appl. No.: 10/440,782

(22) Filed: May 19, 2003

(65) Prior Publication Data

US 2003/0194206 A1 Oct. 16, 2003

Related U.S. Application Data

(62) Division of application No. 09/391,851, filed on Sep. 8, 1999, now Pat. No. 6,678,461, which is a continuation of application No. 08/464,597, filed on Jun. 5, 1995, now Pat. No. 6,058,236, which is a division of application No. 07/866,570, filed on Apr. 10, 1992, now abandoned.

(51) Int. Cl.$^7$ .............................................. H04N 5/91
(52) U.S. Cl. ..................................... 386/125; 386/126
(58) Field of Search ............................. 386/46, 96, 95, 386/111, 112, 125, 126, 83, 52, 65

(56) References Cited

U.S. PATENT DOCUMENTS

| | | | | |
|---|---|---|---|---|
| 4,939,585 A | * | 7/1990 | Kawaguchi et al. | 386/65 |
| 5,946,445 A | * | 8/1999 | Peters et al. | 386/52 |
| 6,058,236 A | * | 5/2000 | Peters et al. | 386/46 |
| 6,678,461 B1 | * | 1/2004 | Peters et al. | 386/52 |
| 2003/0206715 A1 | * | 11/2003 | Peters et al. | 386/65 |

\* cited by examiner

*Primary Examiner*—Huy Nguyen
(74) *Attorney, Agent, or Firm*—Peter J. Gordon

(57) ABSTRACT

The invention disclosed herein is a media recorder for recording live and prerecorded analog audio and/or video information. It is capable of receiving, digitizing, and storing analog audio and/or video information in real time. The invention detects discontinuities in the reception of the analog information and automatically terminates the storage of the information, so the previously received audio and/or video information is stored as a self-contained clip of digitized information. The invention is also capable of receiving and storing digital audio and/or video information from other sources, so that the system can play both the digital audio and/or video information digitized by it and that received from the other sources. This allows both the newly recorded and previously recorded media segments to be evaluated both individually and in context with other segments.

38 Claims, 1 Drawing Sheet

MEDIA RECORDER FOR CAPTURE AND PLAYBACK OF LIVE PRERECORDED AUDIO AND/OR VIDEO INFORMATION

CROSS-REFERENCE TO RELATED APPLICATIONS

This application claims the benefit of 35 U.S.C. §120, and is a divisional application of:

1. Ser. No. 09/391,851, filed Sep. 8, 1999, now U.S. Pat. No. 6,678,461, which is a continuation of Ser. No. 08/464,597, filed Jun. 5, 1995, now U.S. Pat. No. 6,058,236, issued May 20, 2000, which is a divisional of Ser. No. 07/866,570, filed Apr. 10, 1992, now abandoned.

2. Ser. No. 08/464,597, filed Jun. 5, 1995, now U.S. Pat. No. 6,058,236, issued May 20, 2000, which is a divisional of Ser. No. 07/866,570, filed Apr. 10, 1992, now abandoned.

3. Ser. No. 07/866,570, filed Apr. 10, 1992, now abandoned.

BACKGROUND OF THE INVENTION

The invention belongs to the field of audio and video recording. Today, live recordings are usually made by storing a recorded analog signal on an audio or video tape. Tape is also generally the medium used for long-term storage of previously recorded material. This system is effective for the basic recording process, but it presents problems for the evaluation of recorded signals. The linear nature of tape, where later material is recorded on the continuous medium following earlier material, makes access to the recorded material difficult.

For example, the continuous nature of tape provides no convenient means of labeling or locating a particular segment. One segment follows another with no means of delimiting the individual segments; the tape is in essence one long recording rather than a collection of the segments of which it consists. This makes location and access to a particular segment an imprecise process, even if a (manually made) notation of a segment's location is available. A different tape can be used for each segment, but that is an inefficient solution for reasons both of expense and volume of storage.

Audio and video tapes are also poor media for fast playback of recorded material. To play material recorded earlier, the tape must be rewound, which is a time-consuming process even if the location of the desired segment is known. Furthermore, it is often desirable to compare segments of recorded material on more than one tape, which requires switching the player from one tape to another. And to play more than one segment in succession, in order to view segments in context, for example, a new recording must be made or more than one player used, a cumbersome process at best.

SUMMARY OF THE INVENTION

The invention disclosed herein solves these and other problems. The invention is a digital media recorder with special features for recording live and prerecorded analog audio and/or video information. It is capable of receiving, digitizing, and storing analog audio and/or video information in real time. The invention provides the new capability of detecting a discontinuity in the reception of the analog information and automatically terminating the storage of the information. Typically, the detection of a discontinuity in the reception of analog information relies on detection of a trigger signal from the recording device or a discontinuity in a time code signal received with the audio and/or video information.

The preferred embodiment of the invention is also capable of receiving and storing digital audio and/or video information from other sources, so that the system can play both the digital audio and/or video information that it receives directly and that received from the other sources. This allows both the newly recorded and previously recorded media segments to be evaluated both individually and in context with other segments. Moreover, since the media segments are stored digitally, they can be randomly accessed and played back essentially instantly.

Another aspect of the invention allows the automatic logging of format and statistical information regarding the recorded digital audio and/or video clips as they are recorded.

Finally, in a preferred embodiment, the invention is packaged so as to enable the system to withstand shocks for portable operation.

DESCRIPTION OF THE PREFERRED EMBODIMENT

Figure 1:
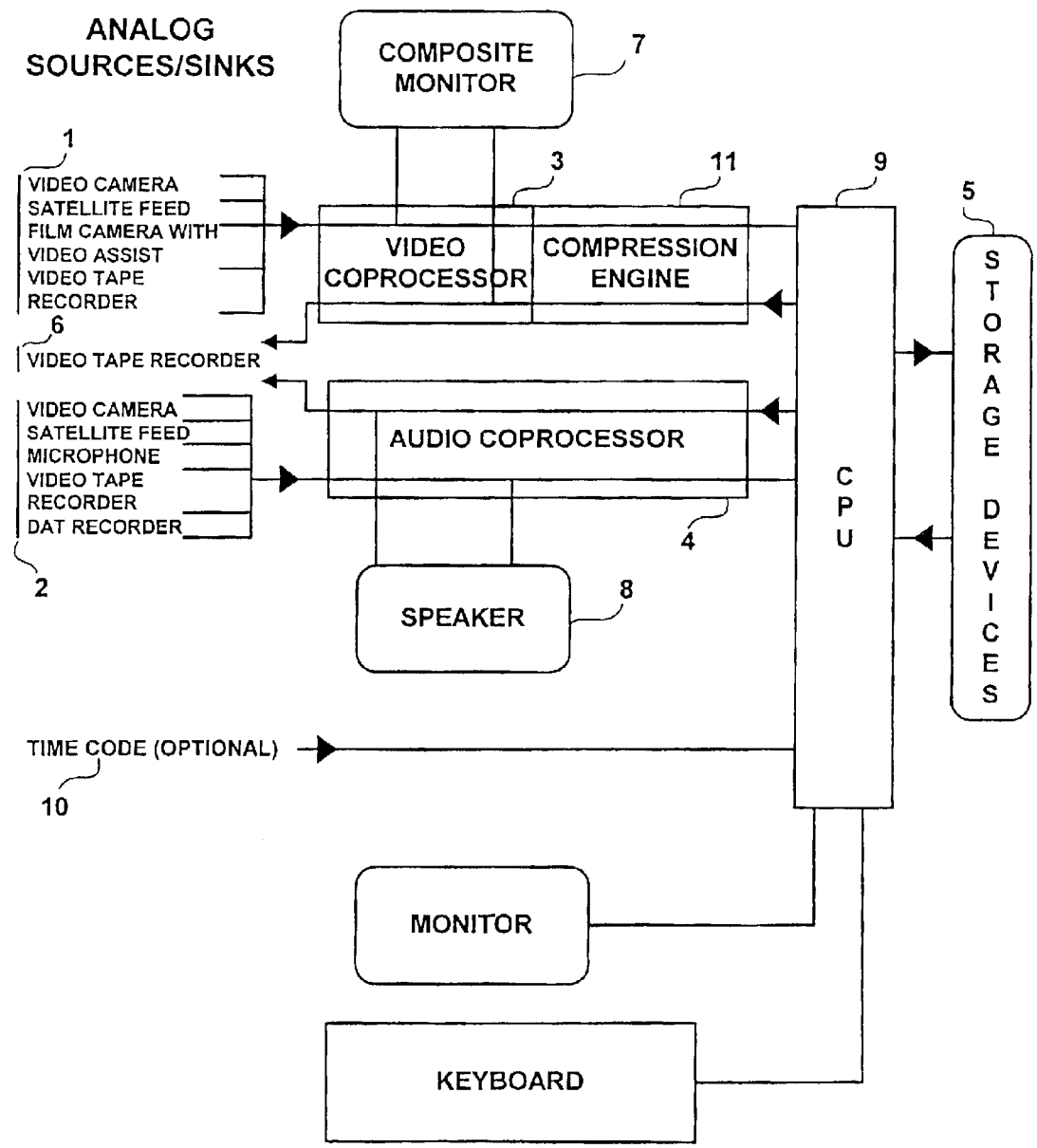
FIG. 1 is a block diagram of the interconnections among the components of the invention.

The invention disclosed herein is a digital media recorder that provides several features useful particularly in recording and evaluating live audio and/or video material. Since the invention stores material digitally, typically on a magnetic disk or in a computer memory, the material can be randomly and immediately accessed, which greatly facilitates the review of material recorded on site. No time is required for developing, as with film, or rewinding, as with videotape. In addition, the system's computer monitors an incoming signal, so when recording ceases the computer prepares the just-recorded information as a self-contained clip that can be immediately played back if desired. The invention's features are more fully discussed in the following paragraphs.

FIG. 1 illustrates the structure of the invention. As the FIGURE shows, analog video sources 1 and analog audio sources 2 are received by video coprocessor 3 and audio coprocessor 4, respectively. (Such digitizing processors are known in the art and commercially available, as for example in products from Avid Technology, Inc., Tewksbury, Mass.) Each of the coprocessors digitizes incoming material and stores it on storage devices 5. (In the FIGURE, compression engine 11 compressed the video information before it is stored, but compression is not essential to the invention.) Storage devices 5 can also contain previously recorded digital media files. Both the digitized material and the previously recorded files can be retrieved and played through video monitor 7 and speakers 8.

The invention provides for the recording of live audio and/or video information by storing each recorded segment as an individual "clip" of material. Typically a production session involves not one long continuous recording but a succession of short takes. As noted above, conventional linear recording techniques record the segments successively on one tape, making it difficult and time-consuming to review earlier takes. In contrast, computer 9 of the present invention monitors the incoming signal, and, on detecting a discontinuity, it stores the recorded information as a clip of material. Then, when recording resumes, the invention begins storing another clip. (Starting and stopping the recording process uses techniques known in the art. For example, the computer would open a disk file and store frames of video data repeatedly until the discontinuity was detected, at which point it would close the file and perhaps store an indication of the total number of frames in the file.) A discontinuity can be detected in any of several ways known to those skilled in the art; a typical approach would be to respond to a trigger signal produced by an audio recorder or video camera or to monitor a time code signal (note time code 10 in FIG. 1) and cease recording when the time code stops advancing.

The recording of material as self-contained clips has several advantages. Foremost among them is that when a clip has been recorded it can be immediately played back. This is useful to enable an operator to immediately determine whether the recording is satisfactory or whether it should be recorded again. This capability is useful not just for video productions but also for film productions where the film camera has a video assist. Moreover, an aspect of the invention is to allow recording of video at twenty-four frames per second to match film speed, rather than at the thirty-frame-per-second rate of normal video. In addition, recording audio and/or video material as distinct clips allows the material to be given informative labels and permits logging of format or statistical information about the material. (The logged information could include any of the following items: number of video frames per second, video resolution, number of audio channels, audio sampling rate, length of clip, time of recording, or start and stop timecodes.) The logged information is stored with the clips, and then the clips can be automatically organized by date of recording or length, a process that would not be convenient with linear recording techniques.

The invention provides especially useful means for evaluating newly recorded material in light of previously recorded material. Both the new material and previous material are stored in a random-access storage device, such as a disk or computer memory, and since both are digital, they can be accessed and displayed immediately, without the record and search time of conventional recording. As noted above, this allows all the different clips to be compared with one from today. No switching of tapes is required, since all the clips are stored on a random-access device.

Even more significantly, though, the invention's storage of clips on disk or in memory allows multiple clips to be played back in sequence. This is possible, again, due the random-access storage of the clips. Thus, a just-completed clip can be played in the context of previously recorded segments in much the same way as it would appear in a final program. This allows the new clip to be evaluated much more usefully. With conventional recording techniques, this process would require much rewinding and swapping of tapes, so that the benefits of immediate playback would be lost.

Finally, since the features of this invention are especially useful for on-site, live recording, it is also designed for portability. Adapting a computer and video system such as this one for portability involves techniques well known to those skilled in the art. The electronic components must be built to withstand jarring so that connections do not loosen, extra ventilation must be provided so that the system can operate in hot environments, and the entire system must be packaged as compactly as possible. Portability allows the advantages of the invention to be used on location as well as in a studio.

What is claimed is:

1. A system for capturing video data defining a moving picture, comprising:

means for receiving the video data from a source;

means for storing, in real time as the video data is received, the video data as a computer data file on a non-volatile random-access computer-readable and rewritable medium;

means for detecting a discontinuity from the source; and means for controlling the means for storing to close the computer data file upon detection of the discontinuity by the means for detecting.

2. The system of claim 1, further comprising means for automatically logging format and statistical information regarding the video data stored in the computer data file.

3. The system of claim 2, wherein the format and statistical information includes at least one of the following: number of video frames per second, video resolution, length of clip, time of recording, and start and stop timecodes.

4. The system of claim 1, further comprising means for reading both the stored video data and other similar video data and for displaying the stored video data and the other similar video data on a video display individually and in sequence.

5. The system of claim 1, further comprising means, connected to receive audio data, for storing the audio data as a computer data file on the nonvolatile random-access, computer-readable and rewritable medium.

6. The system of claim 1, wherein the source comprises a source of live video information.

7. The system of claim 6, wherein the source comprises a satellite feed.

8. The system of claim 6, wherein the source comprises a camera.

9. The system of claim 8, wherein the camera is a video assist connected to a film camera.

10. The system of claim 6, wherein the means for detecting a discontinuity comprises means for monitoring a trigger signal from the source and for determining when the trigger signal indicates that reception of the video data has stopped.

11. The system of claim 10, further comprising:

means for opening a new computer data file after the trigger signal indicates that reception of the video data has resumed.

12. The system of claim 1, wherein the means for detecting a discontinuity comprises means for monitoring a trigger signal from the source and for determining when the trigger signal indicates that reception of the video data has stopped.

13. The system of claim 12, further comprising:

means for opening a new computer data file after the trigger signal indicates that reception of the video data has resumed for storing the video data.

14. The system of claim 1, further comprising:

means for opening a new computer data file after detection of the discontinuity for storing video data received after detection of the discontinuity.

15. The system of claim 1, wherein the means for detecting a discontinuity comprises means for detecting a discontinuity in a time code received with the video data.

16. The system of claim 15, wherein the means for detecting comprises means for determining when the time code stops advancing.

17. The system of claim 16, further comprising means for opening a new computer data file after the time code begins advancing for storing video data received after the time code begins advancing.

18. The system of claim 1, wherein the source comprises prerecorded video information defining a plurality of moving picture segments.

19. The system of claim 18, further comprising means for opening a next computer data file after detection of the discontinuity to store video data of a next moving picture segment received after detection of the discontinuity.

20. A method for capturing video data defining a moving picture, comprising:

receiving the video data from a source;

storing, in real time as the video data is received, the video data as a computer data file on a non-volatile random-access computer-readable and rewritable medium;

detecting a discontinuity from the source; and closing the computer data file upon detection of the discontinuity.

21. The method of claim 20, further comprising:

automatically logging format and statistical information regarding the video data stored in the computer data file.

22. The method of claim 21, wherein the format and statistical information includes at least one of the following: number of video frames per second, video resolution, length of clip, time of recording, and start and stop timecodes.

23. The method of claim 20, further comprising:

reading both the stored video data and other similar video data;

displaying the stored video data and the other similar video data on a video display individually and in sequence.

24. The method of claim 20, further comprising:

receiving audio data; and storing the audio data as a computer data file on the nonvolatile random-access, computer-readable and rewritable medium.

25. The method of claim 20, wherein the source comprises a source of live video information.

26. The method of claim 25, wherein the source comprises a satellite feed.

27. The method of claim 25, wherein the source comprises a camera.

28. The method of claim 27, wherein the camera is a video assist connected to a film camera.

29. The method of claim 25, wherein detecting a discontinuity comprises:

monitoring a trigger signal from the source; and determining when the trigger signal indicates that reception of the video data has stopped.

30. The method of claim 29, further comprising:

opening a new computer data file after the trigger signal indicates that reception of the video data has resumed.

31. The method of claim 20, wherein the detecting a discontinuity comprises:

monitoring a trigger signal from the source; and determining when the trigger signal indicates that reception of the video data has stopped.

32. The method of claim 31, further comprising:

opening a new computer data file after the trigger signal indicates that reception of the video data has resumed for storing the video data.

33. The method of claim 20, further comprising:

opening a new computer data file after detection of the discontinuity for storing video data received after detection of the discontinuity.

34. The method of claim 20, wherein detecting a discontinuity comprises:

detecting a discontinuity in a time code received with the video data.

35. The method of claim 34, wherein detecting a discontinuity comprises:

determining when the time code stops advancing.

36. The method of claim 35, further comprising:

opening a new computer data file after the time code begins advancing for storing video data received after the time code begins advancing.

37. The method of claim 20, wherein the source comprises prerecorded video information defining a plurality of moving picture segments.

38. The method of claim 37, further comprising:

opening a next computer data file after detection of the discontinuity to store video data of a next moving picture segment received after detection of the discontinuity.

* * * * *